United States Patent
Fu et al.

(10) Patent No.: US 12,093,472 B2
(45) Date of Patent: Sep. 17, 2024

(54) STYLUS AND CONTROL METHOD THEREFOR, AND ELECTRONIC DEVICE

(71) Applicant: VIVO MOBILE COMMUNICATION CO., LTD., Dongguan (CN)

(72) Inventors: Conghua Fu, Dongguan (CN); Guohong Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 18/133,506

(22) Filed: Apr. 11, 2023

(65) Prior Publication Data

US 2023/0259221 A1    Aug. 17, 2023

Related U.S. Application Data

(63) Continuation of application No. PCT/CN2021/124099, filed on Oct. 15, 2021.

(30) Foreign Application Priority Data

Oct. 15, 2020    (CN) .......................... 202011104996.2

(51) Int. Cl.
   *G06F 3/038*       (2013.01)
   *G06F 3/0354*      (2013.01)
   *G06F 3/044*       (2006.01)

(52) U.S. Cl.
   CPC .......... *G06F 3/038* (2013.01); *G06F 3/03545* (2013.01); *G06F 3/0442* (2019.05)

(58) Field of Classification Search
   None
   See application file for complete search history.

(56) References Cited

U.S. PATENT DOCUMENTS

2012/0327042 A1\* 12/2012 Harley ................. G06F 3/0442
                                                        345/179
2016/0018911 A1    1/2016 Lan et al.
(Continued)

FOREIGN PATENT DOCUMENTS

CN       107357472 A      11/2017
CN       109683733 A       4/2019
(Continued)

OTHER PUBLICATIONS

International Search Report issued in corresponding International Application No. PCT/CN2021/124099, mailed Feb. 23, 2022, 4 pages.
(Continued)

*Primary Examiner* — Amare Mengistu
*Assistant Examiner* — Sarvesh J Nadkarni
(74) *Attorney, Agent, or Firm* — IPX PLLC

(57) ABSTRACT

A stylus and a control method are provided. The stylus includes: a device body and a touch part. The touch part is arranged at at least one end of the device body. The stylus further includes a first electrode arranged at one end of the touch part far away from the device body, a second electrode and a third electrode arranged on the touch part, and a control circuit arranged on the device body. The control circuit is electrically connected to each of the first electrode, the second electrode, and the third electrode. The second electrode and the third electrode may increase the size of the electrode and ensure efficiency of data transmission between the stylus and a touch device. In addition, the included angle information is detected by using any one of the second electrode or the third electrode.

18 Claims, 9 Drawing Sheets

(56) References Cited

U.S. PATENT DOCUMENTS

2017/0344174 A1\* 11/2017 Pant ................. G06F 3/0441
2018/0095554 A1   4/2018 Yeh
2019/0163320 A1   5/2019 Park
2021/0173497 A1\* 6/2021 He ................. G06F 3/03545

FOREIGN PATENT DOCUMENTS

| CN | 110471546 A | 11/2019 |
|----|-------------|---------|
| CN | 112214118 A | 1/2021  |
| EP | 3289439 A1  | 3/2018  |

OTHER PUBLICATIONS

Extended European Search Report issued in related European Application No. 21879536.7, mailed Feb. 29, 2024, 9 pages.

\* cited by examiner

S801 Control, within a communication cycle in a case that a stylus is electrically connected to a touch device through a first electrode, at least one of a second electrode and a third electrode to detect included angle information within a first time period, and control at least one of the second electrode and the third electrode to transmit data communication information within a second time period

FIG. 8

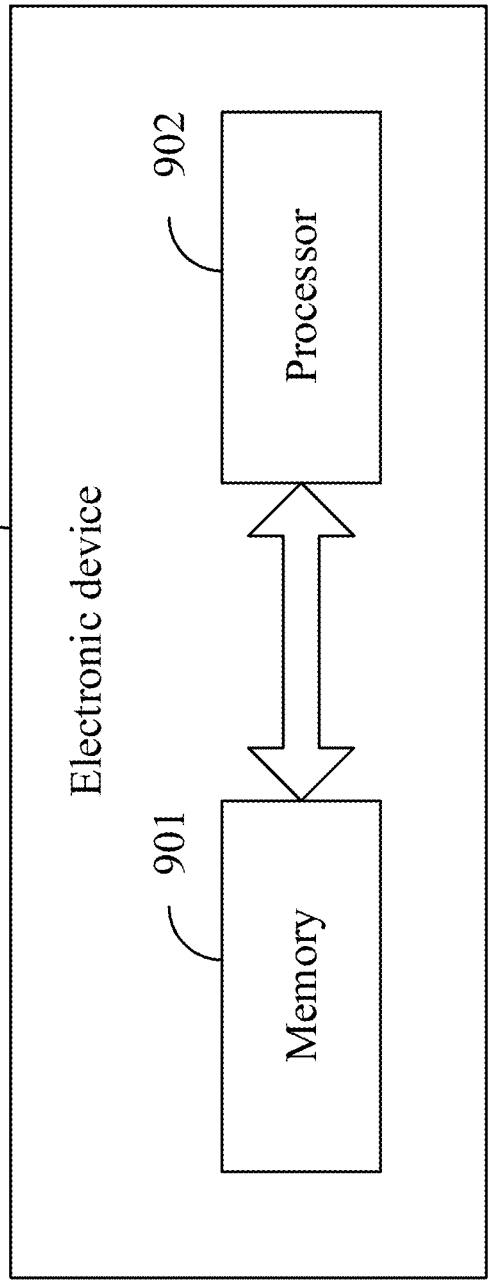

FIG. 9

STYLUS AND CONTROL METHOD THEREFOR, AND ELECTRONIC DEVICE

CROSS-REFERENCE TO RELATED APPLICATIONS

This application is a continuation of International Application No. PCT/CN2021/124099, filed on Oct. 15, 2021, which claims priority to Chinese Patent Application No. 202011104996.2, filed on Oct. 15, 2020. The entire contents of each of the above-referenced applications are expressly incorporated herein by reference.

TECHNICAL FIELD

This application relates to the field of electronic devices, and specifically, to a stylus and a control method therefor, and an electronic device.

BACKGROUND

In various existing electronic devices, a human-computer interaction system is widely used. During operation of the human-computer interaction system, various styli may bring better operation experience to users, to implement functions such as precise tapping, writing, and drawing.

A working principle of the stylus is that: a first electrode is embedded in the middle of a tip of the stylus and a communication component is configured in the stylus. When the stylus swipes on a touchscreen of a terminal such as a smart phone or a tablet computer, a first capacitor is formed between the first electrode and the touchscreen. The existence of the first capacitor enables the touchscreen to detect a position of the tip of the stylus, that is, a first detection region. The existence of the communication component can achieve data communication between the touchscreen and the stylus. However, an existing stroke point of the stylus is relatively single and cannot meet users' requirements for real writing.

SUMMARY

Embodiments of this application provide a stylus and a control method therefor, and an electronic device.

This application is implemented as follows:

According to a first aspect, a stylus is provided, including:
a device body and a touch part, where the touch part is arranged at at least one end of the device body;
a first electrode, where the first electrode is arranged at one end of the touch part far away from the device body;
a second electrode, where the second electrode is arranged on the touch part, and the second electrode and the first electrode are spaced apart from each other;
a third electrode, where the third electrode is arranged on the touch part, and the third electrode is spaced apart from each of the first electrode and the second electrode; and
a control circuit, where the control circuit is arranged on the device body, and the control circuit is electrically connected to each of the first electrode, the second electrode, and the third electrode.

In a case that the stylus is matched with a touch device, a first capacitor is formed between the first electrode and a first region of the touch device, a second capacitor is formed between the second electrode and a second region of the touch device, and a third capacitor is formed between the third electrode and a third region of the touch device, where the touch device includes a touch surface, and the first region, the second region, and the third region are spaced apart from each other on the touch surface.

The second electrode is configured to detect included angle information or transmit data communication information, the third electrode is configured to detect included angle information or transmit data communication information, and the included angle information is the information of the included angle between the stylus and the touch device.

According to a second aspect, a control method for a stylus is provided. The stylus includes: a device body and a touch part, where the touch part is arranged at at least one end of the device body; a first electrode, where the first electrode is arranged at one end of the touch part far away from the device body; a second electrode, where the second electrode is arranged on the touch part, and the second electrode and the first electrode are spaced apart from each other; a third electrode, where the third electrode is arranged on the touch part, and the third electrode is spaced apart from each of the first electrode and the second electrode; and a control circuit, where the control circuit is arranged on the device body, and the control circuit is electrically connected to each of the first electrode, the second electrode, and the third electrode. In a case that the stylus is matched with a touch device, a first capacitor is formed between the first electrode and a first region of the touch device, a second capacitor is formed between the second electrode and a second region of the touch device, and a third capacitor is formed between the third electrode and a third region of the touch device, where the touch device includes a touch surface, and the first region, the second region, and the third region are spaced apart from each other on the touch surface; and the second electrode is configured to detect included angle information or transmit data communication information, the third electrode is configured to detect included angle information or transmit data communication information, and the included angle information is the information of the included angle between the stylus and the touch device; and the method includes:
controlling, within a communication cycle in a case that the stylus is electrically connected to the touch device through the first electrode, at least one of the second electrode and the third electrode to detect the included angle information within a first time period, and controlling at least one of the second electrode and the third electrode to transmit the data communication information within a second time period, where
the first time period and the second time period are time periods that do not completely overlap within one communication cycle.

According to a third aspect, a control apparatus is provided, including:
a first control module, configured to control, within a communication cycle in a case that the stylus is electrically connected to the touch device through the first electrode, at least one of the second electrode and the third electrode to detect the included angle information within a first time period, and control at least one of the second electrode and the third electrode to transmit the data communication information within a second time period, where
the first time period and the second time period are time periods that do not completely overlap within one communication cycle.

According to a fourth aspect, an electronic device is provided, including a processor, a memory, and a program or instructions stored in the memory and executable on the processor, the program or instructions, when executed by the processor, implementing the steps of the method according to the second aspect.

According to a fifth aspect, a readable storage medium is provided, the readable storage medium storing a program or instructions, the program or instructions, when executed by the processor, implementing the steps of the method according to the second aspect.

According to a seventh aspect, an embodiment of this application provides a chip, including a processor and a communication interface, where the communication interface is coupled to the processor, and the processor is configured to run a program or instructions to implement the method according to the second aspect.

According to a seventh aspect, an embodiment of this application provides a computer program product, where the computer program product is stored in a non-volatile storage medium, and the computer program product is configured to be executed by at least one processor to implement steps of the method according to the second aspect.

According to an eighth aspect, an embodiment of this application provides a processing apparatus. The processing apparatus is configured to perform the steps of the method according to the second aspect.

Embodiments of this application provide a stylus, including: a device body and a touch part, the touch part being arranged at at least one end of the device body, a first electrode arranged at one end of the touch part far away from the device body, a second electrode arranged on the touch part and configured to detect included angle information or transmit data communication information, a third electrode arranged on the touch part and configured to detect included angle information or transmit data communication information, and a control circuit arranged on the device body, the control circuit being electrically connected to each of the first electrode, the second electrode, and the third electrode. In a case that the stylus is matched with a touch device, a first capacitor is formed between the first electrode and a first region of the touch device, a second capacitor is formed between the second electrode and a second region of the touch device, and a third capacitor is formed between the third electrode and a third region of the touch device. The touch device includes a touch surface, and the first region, the second region, and the third region are spaced apart from each other on the touch surface. The existence of the second electrode and the third electrode may increase the size of the electrode and ensure efficiency of data transmission between the stylus and touch device. In addition, the included angle information is detected by using any one of the second electrode and the third electrode, so that an included angle between the stylus and the touch device may be measured more accurately. The touch device may control the thickness of handwriting according to different included angles, so that handwriting displayed on the touch device may be closer to a stroke point effect achieved by real writing.

BRIEF DESCRIPTION OF THE DRAWINGS

The accompanying drawings described herein are used for providing a further understanding of this application, and form part of this application. Exemplary embodiments of this application and descriptions thereof are used for explaining this application, and do not constitute any inappropriate limitation to this application. In the accompanying drawings:

FIG. 8 is a flowchart of a control method for a stylus according to an embodiment of this application;

FIG. 9 is a schematic diagram of a structure of an electronic device according to an embodiment of this application.

DETAILED DESCRIPTION

The following describes the technical solutions in the embodiments of this application with reference to the accompanying drawings in the embodiments of this application. Apparently, the described embodiments are some rather than all of the embodiments of this application. All other embodiments obtained by a person skilled in the art based on the embodiments of this application without creative efforts shall fall within the protection scope of this application.

In the specification and the claims of this application, the terms "first", "second", and so on are intended to distinguish similar objects but do not necessarily indicate a specific order or sequence. It is to be understood that the data termed in such a way are interchangeable in appropriate circumstances, so that the embodiments of this application can be implemented in orders other than the order illustrated or described herein. In addition, "and/or" used in the specification and the claims represents at least one of the connected objects, and a character "/" in this specification generally indicates an "or" relationship between the associated objects.

The stylus and the control method therefor, and the electronic device provided in the embodiments of this application are described in detail below with reference to the accompanying drawings by using specific embodiments and application scenarios thereof.

Figure 1:
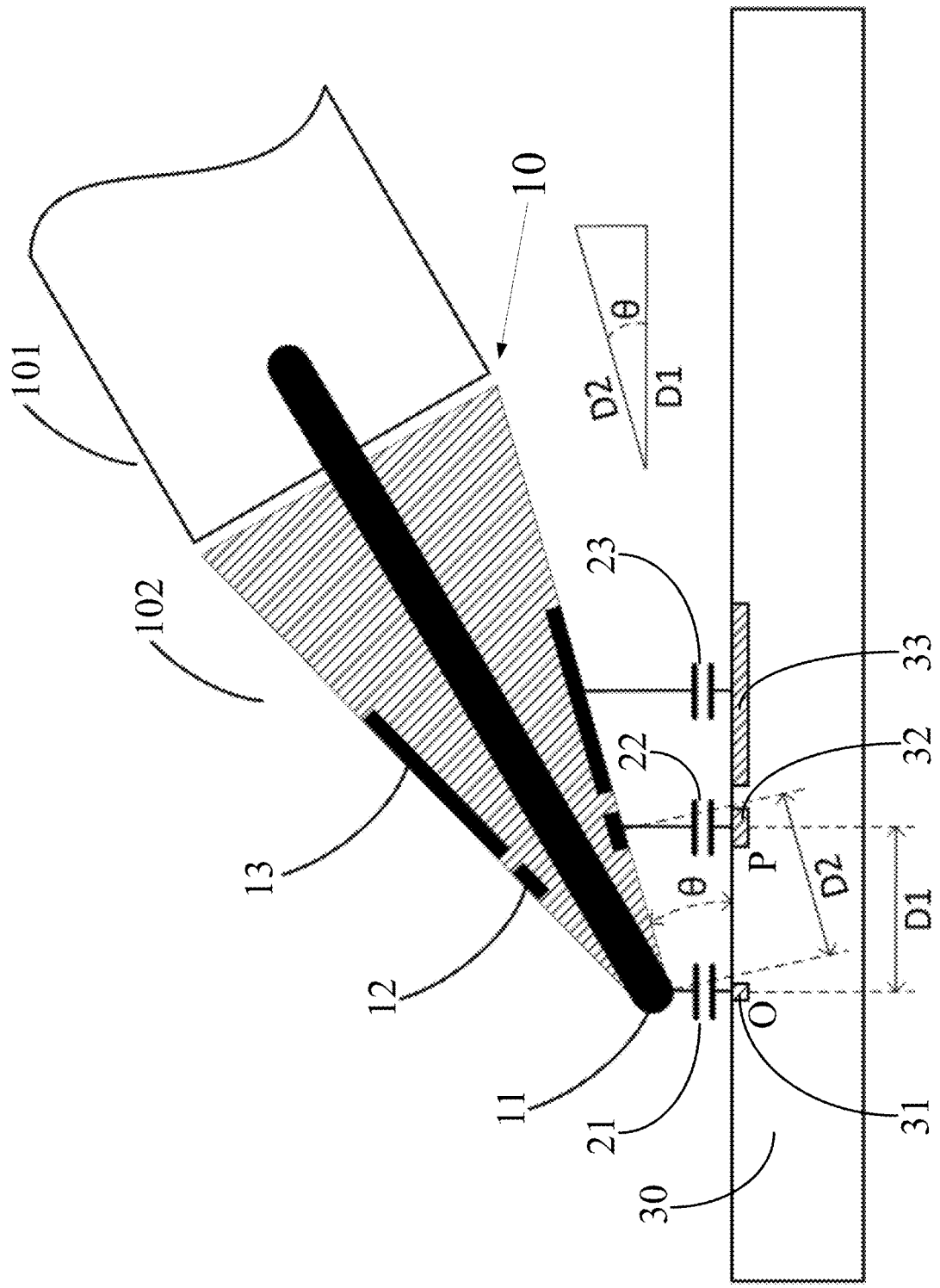
FIG. 1 is a schematic diagram of a structure of a stylus according to an embodiment of this application.
Figure 2:
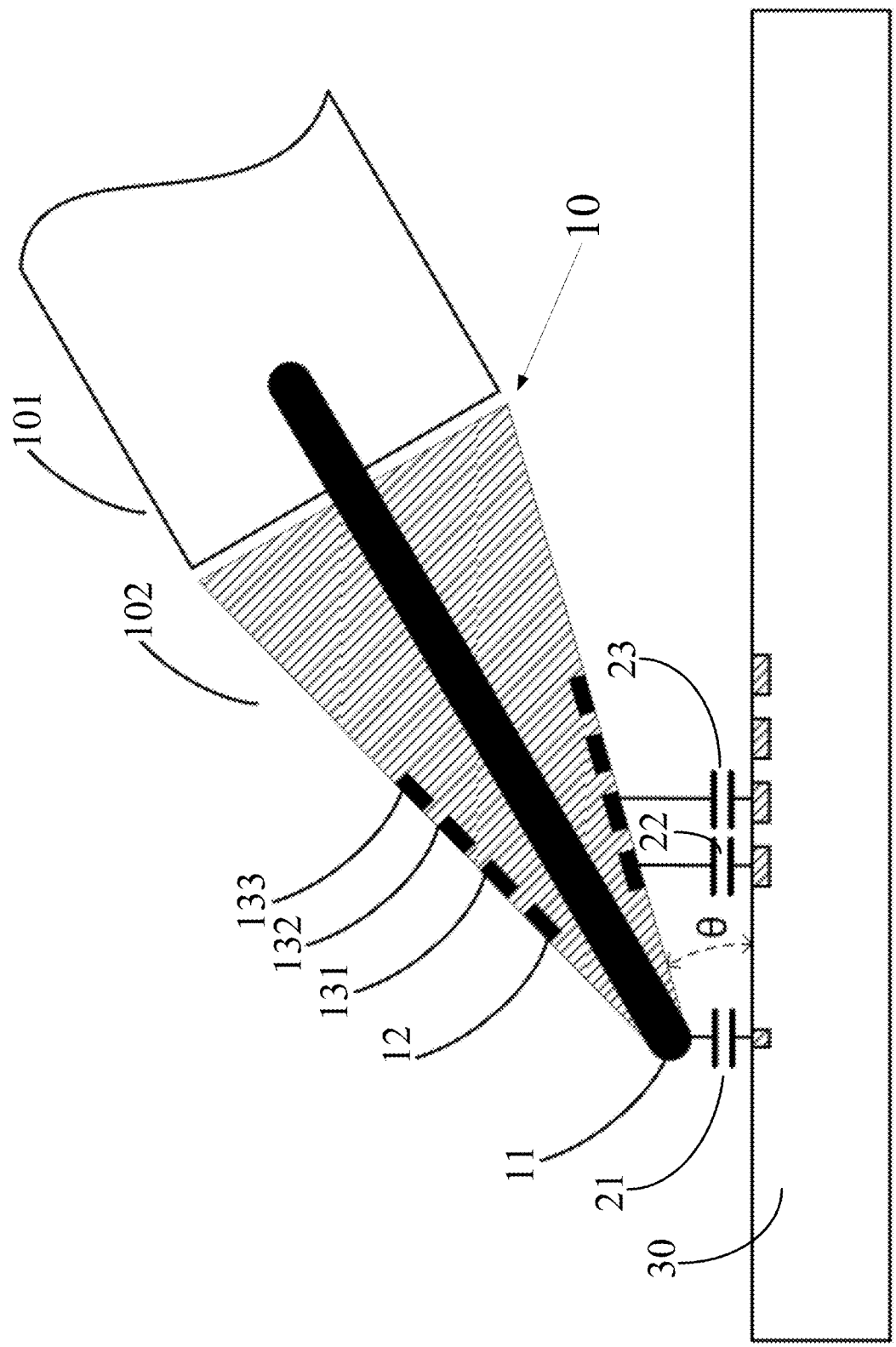
FIG. 2 is another schematic diagram of a structure of a stylus according to an embodiment of this application.

As shown in FIG. 1 and FIG. 2, the stylus 10 may include a device body 101, a touch part 102, a first electrode 11, a second electrode 12, a third electrode 13, and a control circuit 14.

In some embodiments, the touch part is arranged at at least one end of the device body. The first electrode 11 is arranged at one end of the touch part far away from the device body. Both the second electrode 12 and the third electrode 13 are arranged on the touch part, and the first electrode 11. The second electrode 12, and the third electrode 13 are spaced apart from each other, and all the first electrode 11, the second electrode 12, and the third electrode 13 are connected to the control circuit 14. Further, the first electrode is at least partially exposed at the end of the touch part far away from the device body, so as to communicate with the touch device. In a case that the stylus is matched with a touch device, a first capacitor is formed between the first electrode and a first region of the touch device, a second capacitor is formed between the second electrode and a second region of the touch device, and a third capacitor is formed between the third electrode and a third region of the touch device, where the touch device includes a touch surface, and the first region, the second region, and the third region are spaced apart from each other on the touch surface. The second electrode is configured to detect included angle information or transmit data communication information, the third electrode is configured to detect included angle information or transmit data communication information, and the included angle information is the information of the included angle between the stylus and the touch device.

Embodiments of this application provide a stylus, including: a device body and a touch part, the touch part being arranged at at least one end of the device body, a first electrode arranged at one end of the touch part far away from the device body, a second electrode arranged on the touch part and configured to detect included angle information or transmit data communication information, a third electrode arranged on the touch part and configured to detect included angle information or transmit data communication information, and a control circuit arranged on the device body, the control circuit being electrically connected to each of the first electrode, the second electrode, and the third electrode. In a case that the stylus is matched with a touch device, a first capacitor is formed between the first electrode and a first region of the touch device, a second capacitor is formed between the second electrode and a second region of the touch device, and a third capacitor is formed between the third electrode and a third region of the touch device. The touch device includes a touch surface, and the first region, the second region, and the third region are spaced apart from each other on the touch surface. In this embodiment, the stylus may implement data transmission through at least one of the second electrode and the third electrode, and the existence of the second electrode and the third electrode may increase the size of the electrode and ensure efficiency of data transmission between the stylus and the touch device. In addition, the included angle information is detected by using any one of the second electrode and the third electrode, so that an included angle between the stylus and the touch device may be measured more accurately. The touch device may control the thickness of handwriting according to different included angles, so that handwriting displayed on the touch device may be closer to a stroke point effect achieved by real writing.

Further, the touch device may be an electronic device with a touchscreen, such as a mobile phone or a tablet computer. This is not specifically limited in this application.

In this embodiment of this application, a surface of the touch part is not parallel to an axis of the stylus. For example, the touch part may be in a shape of an arc or a frustum. In some embodiments, the touch part may be of a cone-shaped structure, for example, a conical structure or a polygonal pyramid structure such as a triangular pyramid or a quadrangular pyramid. The top of the cone-shaped structure is arranged at one end far away from the device body. The first electrode is arranged on the top of the cone-shaped structure, and the first electrode is at least partially exposed on the top of the cone-shaped structure. Both the second electrode and the third electrode may be arranged on an outer surface of the cone-shaped structure. Further, there may be one or more second electrodes and third electrodes, and various situations fall within the protection scope of this application.

Further, since the electrodes are spaced apart from each other, an insulating region may be arranged between the electrodes, and an insulating material, such as rubber, silicone, or plastic is included in the insulting region.

In this embodiment of this application, both the second electrode and the third electrode may be configured to detect included angle information or transmit data communication information. The following are examples of possible situations, but this application is not limited to the following situations.

Both the second electrode and the third electrode may be configured to detect the included angle information. In this case, the data communication information may be transmitted through another electrode, or may be transmitted through another communication module configured in the stylus, for example, a Bluetooth module, a Wi-Fi module, or a millimeter wave communication module.

Both the second electrode and the third electrode may be configured to transmit the data communication information.

One of the second electrode and the third electrode is configured to detect the included angle information, and the other is configured to transmit the data communication information.

The second electrode may be configured to detect first angle information or transmit data communication information, and the third electrode may be configured to detect second angle information or transmit data communication information. The first angle information is the information of the included angle between the second electrode and the touch device, and the second angle information is the information of the included angle between the third electrode and the touch device.

The second electrode may be configured to transmit first data communication information, and the third electrode may be configured to transmit second data communication information.

Further, in a case that one of the second electrode and the third electrode is configured to detect included angle information, and the other is configured to transmit data communication information, to detect the included angle information more accurately and transmit data more efficiently, a projection area of the second electrode and a projection area of the third electrode are different on a plane on which an axis of the stylus is used as a normal.

In some embodiments, the projection area of the second electrode is smaller than the projection area of the third electrode when the second electrode is configured to detect the included angle information, and the third electrode is configured to transmit the data communication information. Correspondingly, the projection area of the third electrode is smaller than the projection area of the second electrode when the third electrode is configured to detect the included angle information, and the second electrode is configured to transmit the data communication information.

In a possible implementation of this application, the second electrode and the third electrode are both annular electrodes and are spaced apart from each other in an axial direction of the stylus.

For example, the second electrode and the third electrode are arranged around the touch part. No matter how the stylus rotates, the included angle information can be detected and the data communication information can be transmitted, which is more convenient for users to use.

In a possible implementation of this application, the first electrode is made of a conductive material such as a copper rod. When the first electrode is electrically connected to the control circuit, a first capacitor is formed between the first electrode and a first region of the touch device, and a high-voltage pulse signal generated by the control circuit is coupled to the touch device through the first capacitor, so that the touch device detects approach of the first electrode of the stylus, and a corresponding first region is sensed on the touch device. Since the first electrode is arranged at the tip of the cone and has a small size, the area of the region sensed on the touch device is also small, and the region may be approximately regarded as a "point", which may be assumed as a point O. A function of the first electrode 11 is mainly to trigger handwriting on the touch device.

The touch part of the stylus may be made of an insulating material, such as rubber, silicone, or plastic. In order to detect the included angle between the stylus and the touch device more accurately, the second electrode and the third electrode may be arranged on an outer surface of the touch part and arranged around the tip of the stylus. In this way, all the first electrode, the second electrode, and the third electrode may be located on the surface of the touch part, that is, on a plane, which facilitates in subsequently measuring a distance and detecting included angle information. Generally, the second electrode and the third electrode may be bonded to an outer surface of the tip of the stylus through a process such as laser engraving, injection molding, spraying, adhesive bonding, or hot pressing.

In order to further improve accuracy of detecting the included angle, the size of an electrode configured to detect included angle information may be set to be relatively small. Taking the second electrode as an example, the size of the second electrode 12 may be set to be relatively small, and the second electrode is electrically connected to the control circuit. When the stylus approaches to the touch device, a second capacitor is formed between the second electrode and a region corresponding to the touch device, and a high-voltage pulse signal generated by the control circuit is coupled to the touch device through the second capacitor, so that the touch device can detect approach of the second electrode of the stylus, and a corresponding second region is sensed on the touch device. Since the size of the second electrode is small, the area of the region sensed on the touch device is also small, and the region may be approximately regarded as a "point", which may be assumed as a point P.

In some embodiments, the included angle information between the stylus and the touch device may be determined in the following manners.

Since positions of the first electrode and the second electrode on the stylus are determined, a distance D2 between the first electrode and the second electrode on the stylus may further be determined. When the stylus approaches to the touch device, positions sensed by the first electrode and the second electrode on the touch device are a point O and a point P, and correspondingly, a distance D1 between the point O and the point P may also be determined. Therefore, an included angle θ between the stylus and the touch device 30 may be determined according to a trigonometric function, which is as follows: cos θ=D1/D2

Further, θ=arc cos (D1/D2) may be determined.

A function of the second electrode may be to detect the angle between the stylus and the touch device, to detect an inclination angle of the stylus. When an angle of the stylus inclining to the touch device is larger, the handwriting controlled and displayed by the touch device is thinner. When the angle of the stylus inclining to the touch device is smaller, the handwriting controlled and displayed by the touch device is thicker. In this way, a stroke point effect of real writing can be simulated. In some alternative embodiments, the second electrode may be configured to transmit data communication information to the touch device.

In order to make data transmission faster and more accurate, the size of an electrode configured to transmit data communication information is relatively large. Using an example in which the third electrode transmits the data communication information, the size of the third electrode is relatively large, and the third electrode is electrically connected to the control circuit. When the stylus approaches to the touch device, a third capacitor is formed between the third electrode and a corresponding region on the touch device, and a high-voltage pulse signal generated by the control circuit is coupled to the touch device through the third capacitor, so that the touch device detects approach of the third electrode of the stylus, and a corresponding third region is sensed on the touch device. Since the size of the third electrode is relatively large, the area of the region sensed on the touch device is also large, and a coupling area between the third electrode and the touch device is relatively large, the third electrode is more suitable for data transmission, so as to implement data communication between the stylus and a terminal through the touch device. For example, the stylus transmits pressure data to the touch device through the third capacitor, and the touch device transmits a tactile feedback control command to the stylus through the third capacitor.

Further, the third electrode 13 may include a plurality of sub-electrodes. The plurality of sub-electrodes are electrically connected in parallel, and the plurality of sub-electrodes are spaced apart from each other in an axial direction of the stylus. For example, the third electrode includes a first sub-electrode 131, a second sub-electrode 132, a third sub-electrode 133 shown in FIG. 2. A quantity of sub-electrodes is not specifically limited in this application and depends on an actual situation.

In some embodiments, areas of the plurality of sub-electrodes may not be exactly the same. In an embodiment, the areas of the sub-electrodes may gradually increase in an axial direction from an end of the touch part 102 far away from the device body 101, to transmit data communication information or detect included angle information. In another embodiment, an area of each sub-electrode in the axial direction of the stylus may be close to an area of the second electrode in the axial direction of the stylus.

Further, the stylus has a first working state and a second working state.

In some embodiments, the stylus detects the included angle information through at least one of the second electrode and the plurality of sub-electrodes in a case that the stylus is in the first working state; and the stylus transmits the data communication information through at least one of the second electrode and the plurality of sub-electrodes in a case that the stylus is in the second working state.

It is to be noted that the at least one electrode is one of the second electrode and the plurality of sub-electrodes. Since the included angle information may be detected through the first electrode and any electrode other than the first electrode, only one of the second electrode or the plurality of sub-electrodes is required. Similarly, the data communication information may be transmitted only through an electrode other than the first electrode. At least one of the following embodiments is the same as this embodiment, and details are not described in the following embodiments again.

Further, which electrode is used for transmission of the data communication information may be determined according to a size or type of data. For example, when data is relatively large, the data may be divided into two or more data packets, and the two or more data packets are respectively transmitted according to an area of an electrode, so that data transmission is faster, and data loss is not prone to occur. In another example, data such as pressing strength and acceleration may be transmitted through different electrodes.

At least one of the second electrode or the plurality of sub-electrodes of the third electrode may be used to transmit the data communication information. To ensure a data transmission rate and precision, the data communication information may be transmitted through at least two of the plurality of sub-electrodes of the third electrode 13 in parallel, or the data communication information may be transmitted through at least one of the second electrode and the plurality of sub-electrodes.

In an implementation of this application, a quantity of parallel-connected sub-electrodes that are connected to the control circuit may be increased through an included angle between the stylus and the touch device. Since a larger included angle means that a degree of capacitive coupling between the stylus and the touch device is reduced, and efficiency and stability of data transmission may be reduced, reduction of the efficiency and stability of data transmission caused by reduction of the degree of capacitance coupling may be alleviated through more electrodes, thereby improving communication quality.

Further, an electrode for angle detection may be changed based on the size of the included angle. In other words, when the included angle is relatively small, a projection position of an electrode on the touch device changes slowly, and angle detection may not be sensitive enough. In this case, angle detection may be performed by using an electrode farther away from the first electrode, to increase a distance increment of D1 to improve detection sensitivity. When the included angle is relatively large, a projection position of an electrode on the touch device changes quickly, angle detection is relatively sensitive, and coordinate data is prone to jitter. In this case, the distance increment of D1 may be appropriately reduced to suppress the detection sensitivity, that is, the included angle information may be detected by using an electrode closer to the first electrode, so that detected data is more accurate.

In a possible implementation of this application, the control circuit may include a coding circuit, a data communication circuit, and a circuit switching module.

In some embodiments, the coding circuit and the data communication circuit are each electrically connected to a first end of the circuit switching module, and the second electrode and the third electrode are each electrically connected to a second end of the circuit switching module. The stylus has a first working state and a second working state. At least one of the second electrode and the third electrode is electrically connected to the coding circuit through the circuit switching module in a case that the stylus is in the first working state; and at least one of the second electrode and the third electrode is electrically connected to the data communication circuit through the circuit switching module in a case that the stylus is in the second working state.

In other words, through the circuit switching module, the coding circuit is controlled to be connected to the electrodes, and the data communication circuit is controlled to be connected to the electrodes.

In some embodiments, the coding circuit may include two coding sub-circuits, namely, a first coding sub-circuit and a second coding sub-circuit. Two coding circuits are respectively connected to the first electrode and another electrode through the switching module and are configured to detect included angle information, where the another electrode is at least one of the second electrode and the third electrode.

The first coding sub-circuit and the second coding sub-circuit may be exactly the same, or may be exactly different. When the first coding sub-circuit and the second coding sub-circuit are exactly the same, the first coding sub-circuit and the second coding sub-circuit may be combined into one coding circuit, that is, the coding circuit is connected to both the first electrode and the another electrode. In some alternative embodiments, the first coding sub-circuit and the second coding sub-circuit may be exactly different. For example, amplitudes, frequencies, duty cycles, phases, and the like of generated high-voltage pulse signals are all different, and even modulation and coding rules for pulse waveforms are different.

Further, an electrode for detecting the included angle information may be changed based on a change trend of the included angle. In other words, when the included angle is relatively small, a projection position of an electrode on the touch device changes slowly, and angle detection may not be sensitive enough. In this case, detection of the included angle information may be performed by using an electrode farther away from the first electrode, to increase a distance increment of D1 to improve detection sensitivity. When the included angle is relatively large, a projection position of an electrode on the touch device changes quickly, angle detection is relatively sensitive, and coordinate data is prone to jitter. In this case, the distance increment of D1 may be appropriately reduced to suppress the detection sensitivity, that is, the included angle information may be detected by using an electrode closer to the first electrode, so that detected data is more accurate. In other words, the second coding sub-circuit is connected to different electrodes, to change the increment of D1, so that data on detection of the included angle information is more accurate.

In an embodiment, using two coding circuits as an example, within a time period for inclination angle detection and outside a time period for data transmission, the first coding sub-circuit is connected to the first electrode, and the second coding sub-circuit may adaptively choose, according to the size of the included angle, to be connected to the second electrode or the third electrode.

In a possible implementation of this application, the third electrode includes a plurality of sub-electrodes, the plurality of sub-electrodes being electrically connected in parallel, and the plurality of sub-electrodes being spaced apart from each other in an axial direction of the stylus, the coding circuit and the data communication circuit are each electrically connected to the first end of the circuit switching module, and the second electrode and the sub-electrodes are each electrically connected to the second end of the circuit switching module; in a case that the stylus is in the first working state, the coding circuit is electrically connected to at least one of the second electrode and the plurality of sub-electrodes through the circuit switching module according to the included angle information; and in a case that the stylus is in the second working state, the data communication circuit is electrically connected to at least one of the second electrode and the plurality of sub-electrodes through the circuit switching module according to the included angle information.

Figure 3:
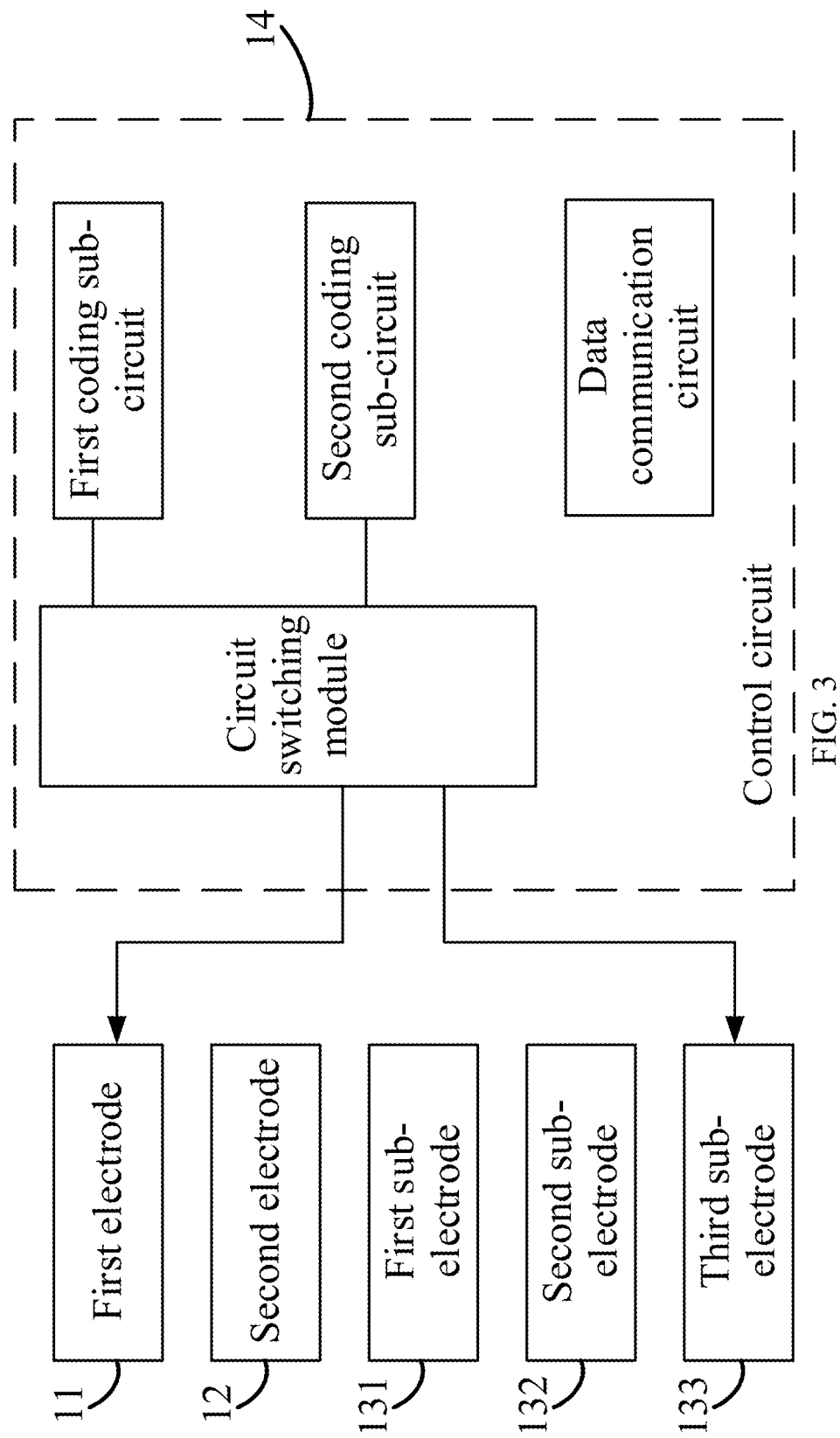
FIG. 3 is a schematic circuit diagram of a measured included angle according to an embodiment of this application.
Figure 4:
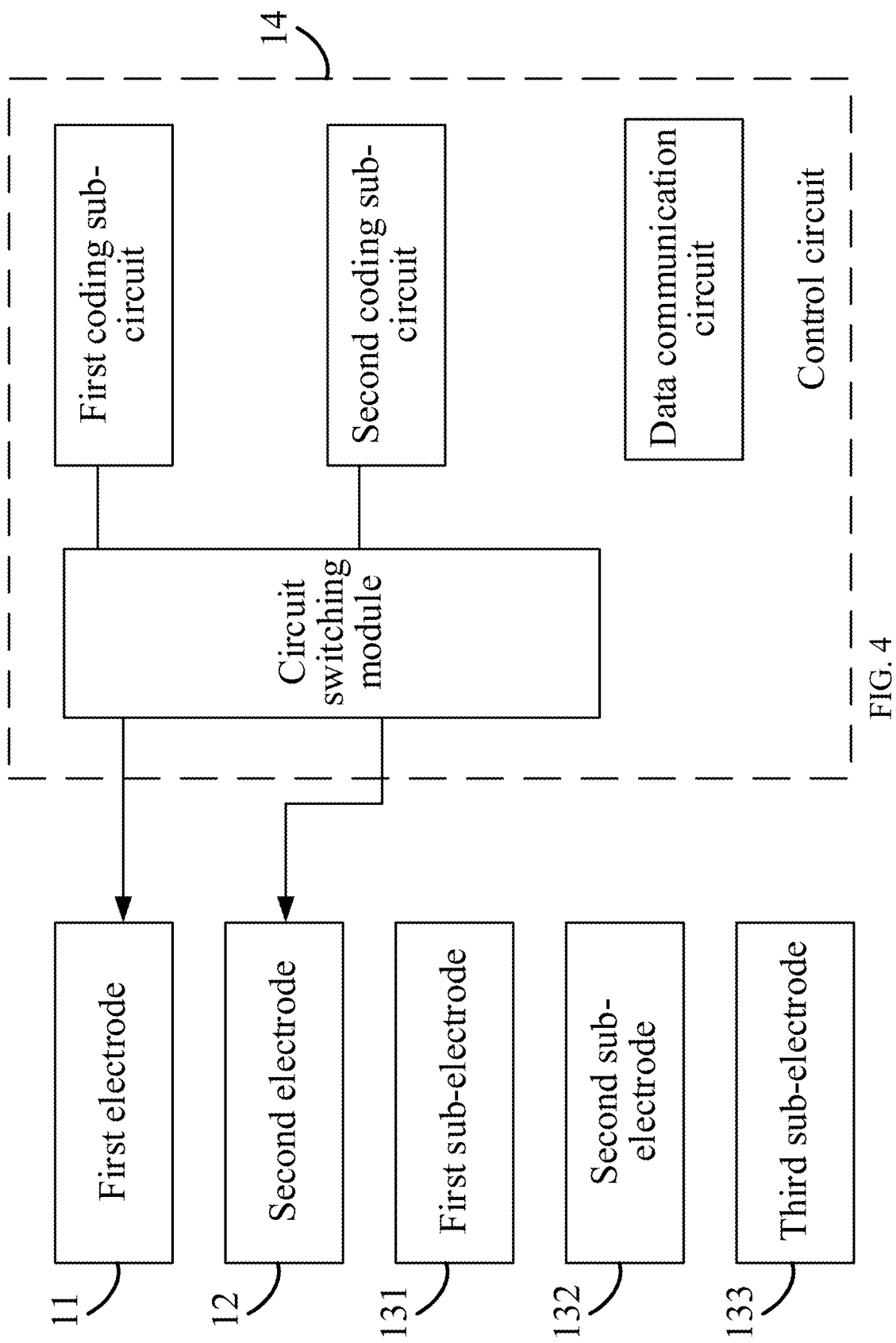
FIG. 4 is a schematic circuit diagram of another measured included angle according to an embodiment of this application.

In an embodiment, using two coding circuits as an example, within a time period for inclination angle detection and outside a time period for data transmission, the first coding sub-circuit is connected to the first electrode, and the second coding sub-circuit may adaptively choose, according to the size of the included angle, to be connected to the second electrode, the first sub-electrode 131, the second sub-electrode 132, and the third sub-electrode 133. As shown in FIG. 3, when the included angle is relatively small, angle detection is performed by using the third sub-electrode 133 farther away from the first electrode 11, that is, the first coding sub-circuit is connected to the first electrode through the circuit switching module, and the second coding sub-circuit is connected to the third sub-electrode through the circuit switching module, to increase the distance increment of D1 to improve the detection sensitivity. As shown in FIG. 4, when the included angle is relatively large, angle detection is performed by using the second electrode 12 closer to the first electrode 11, that is, the first coding sub-circuit is connected to the first electrode through the circuit switching module, and the second coding sub-circuit is connected to the second electrode through the circuit switching module, to decrease the distance increment of D1 to suppress the detection sensitivity, so that detected data is more accurate.

Further, the quantity of parallel-connected sub-electrodes may be increased through the included angle between the stylus and the touch device. In other words, a quantity of electrodes connected to the data communication circuit is different. Since a larger included angle means that a degree of capacitive coupling between the stylus and the touch device is reduced, and efficiency and stability of data transmission may be reduced, reduction of the efficiency and stability of data transmission caused by reduction of the degree of capacitive coupling may be alleviated through more electrodes, thereby improving communication quality. That is, the circuit switching module is used to control the data communication circuit to be connected to more electrodes to improve the communication quality.

Figure 5:
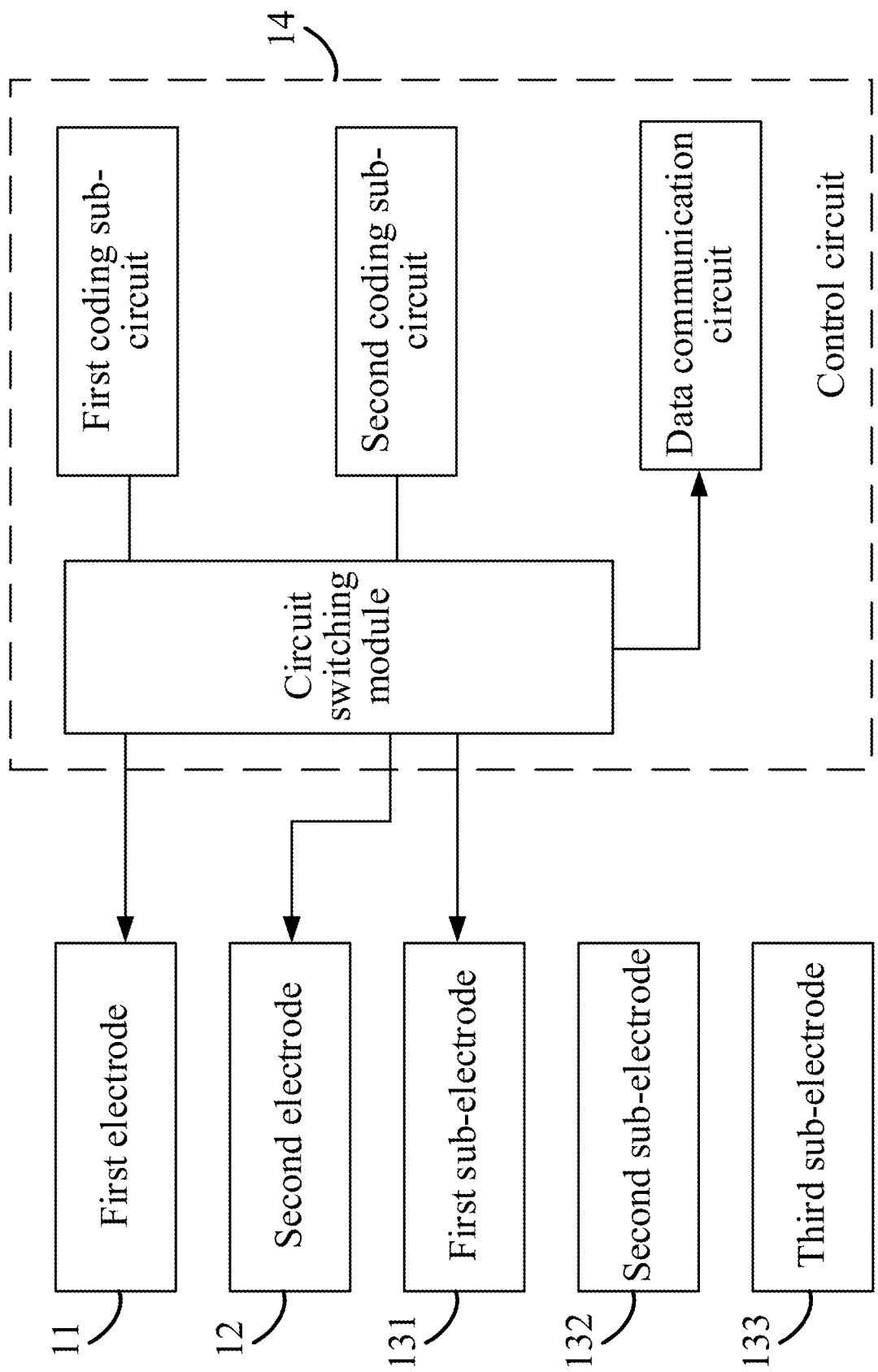
FIG. 5 is a schematic circuit diagram of a communication manner according to an embodiment of this application.
Figure 6:
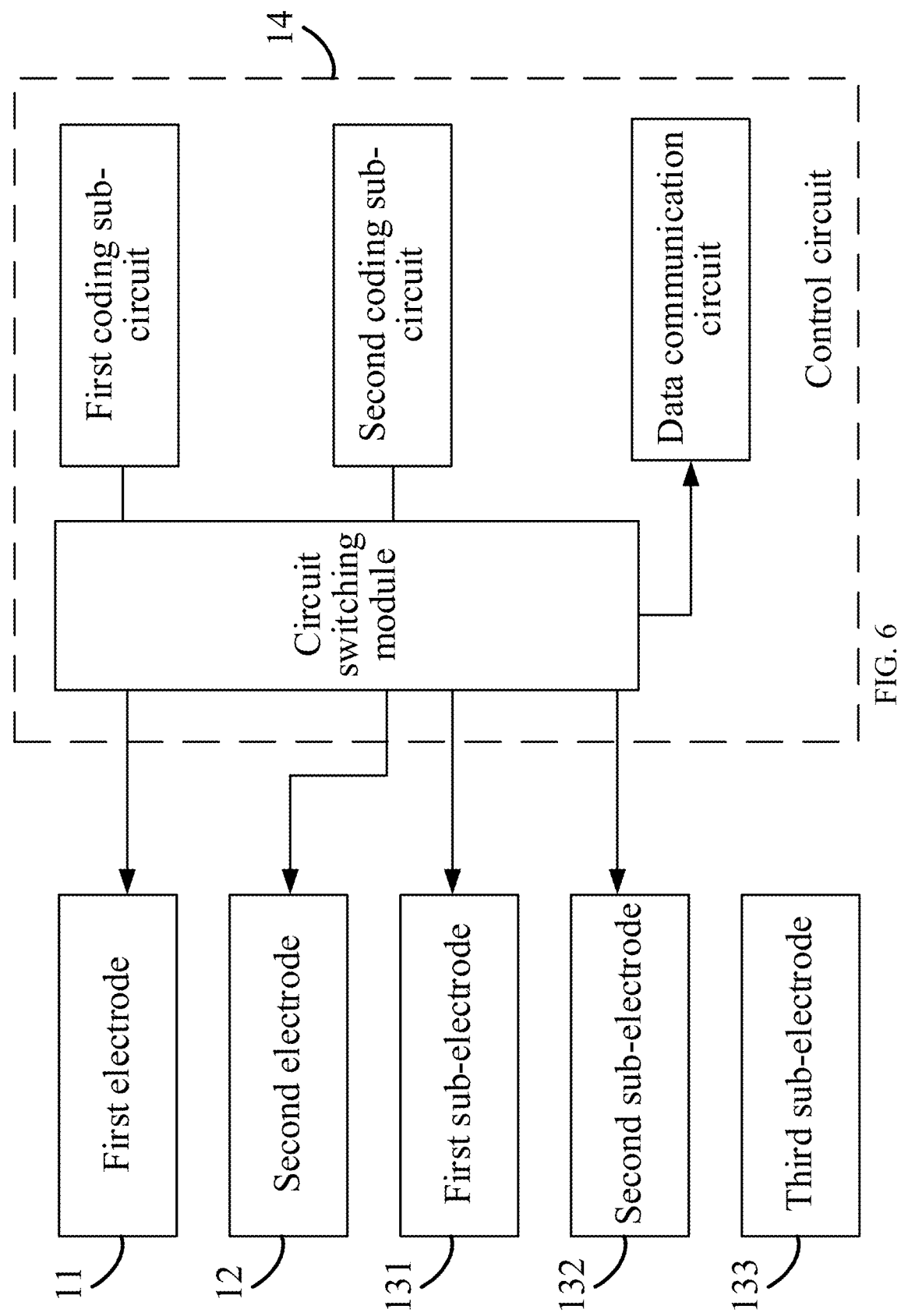
FIG. 6 is a schematic circuit diagram of another communication manner according to an embodiment of this application.
Figure 7:
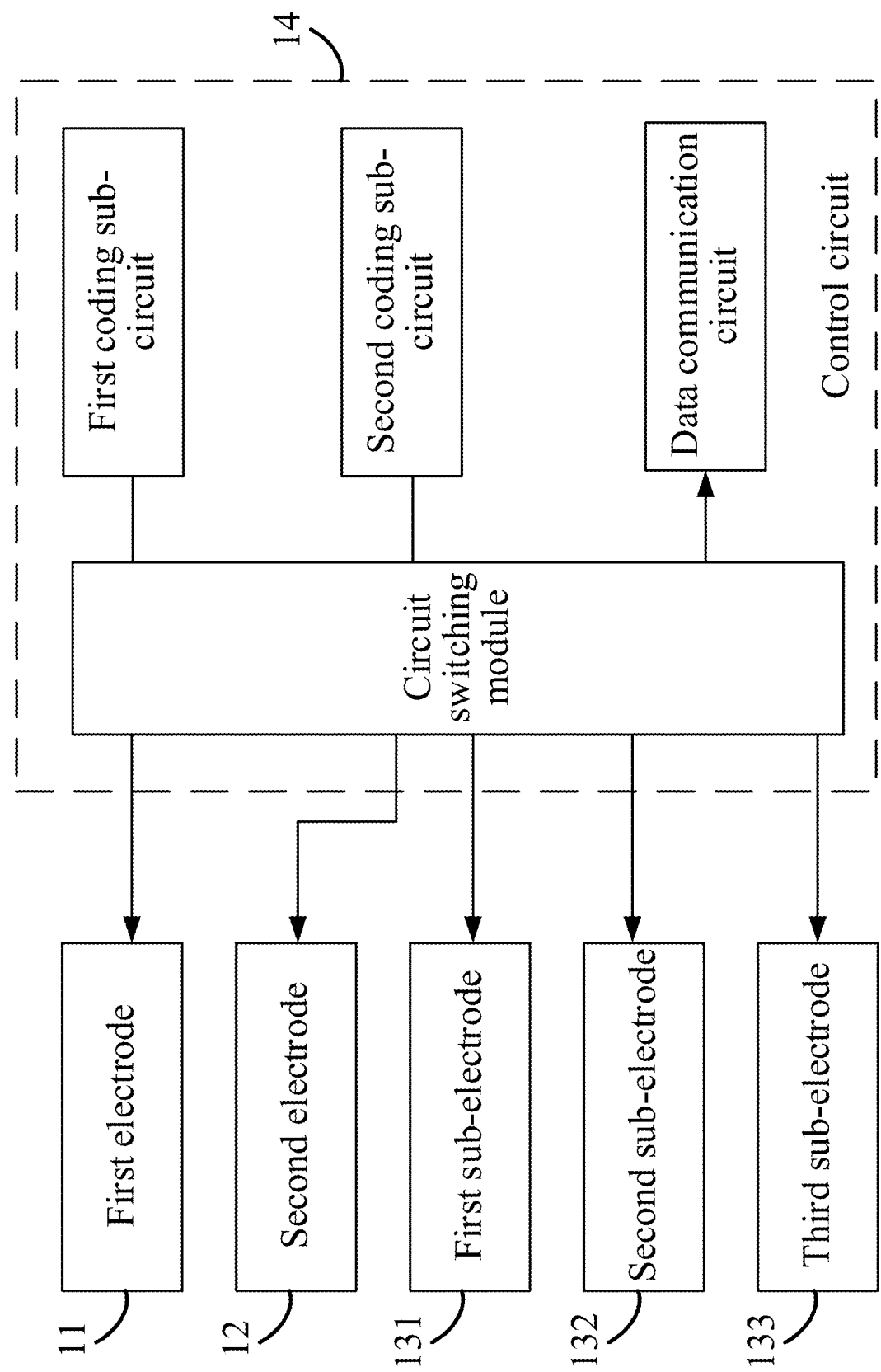
FIG. 7 is a schematic circuit diagram of still another communication manner according to an embodiment of this application.

In an embodiment, using two coding circuits as an example, the first coding sub-circuit is connected to the first electrode 11, and the second coding sub-circuit is connected to the second electrode 12. As shown in FIG. 5, when the included angle between the stylus and the touch device is relatively small, the first coding sub-circuit is connected to the first electrode through the circuit switching module, the second coding sub-circuit is connected to the second electrode through the circuit switching module, and the data communication circuit is connected to the first sub-electrode 131 through the circuit switching module. As shown in FIG. 6, when the included angle between the stylus and the touch device is slightly large, the first coding sub-circuit is connected to the first electrode through the circuit switching module, the second coding sub-circuit is connected to the second electrode through the circuit switching module, and the data communication circuit is connected to the first sub-electrode 131 and the second sub-electrode 132 through the circuit switching module. As shown in FIG. 7, when the included angle between the stylus and the touch device is relatively large, the first coding sub-circuit is connected to the first electrode through the circuit switching module, the second coding sub-circuit is connected to the second electrode through the circuit switching module, and the data communication circuit is connected to the first sub-electrode 131, the second sub-electrode 132, and the third sub-electrode 133 through the circuit switching module.

An embodiment of this application further provides a touch device, configured to communicate with the stylus according to any one of the foregoing embodiments. The touch device can sense each electrode on the stylus, detect an included angle through each electrode on the stylus, and correspondingly feedback data transmitted by the electrode. Details are not described in this embodiment of this application.

An embodiment of this application further provides a control method for a stylus. The stylus is the stylus in the foregoing embodiments. The stylus includes: a device body and a touch part, where the touch part is arranged at at least one end of the device body; a first electrode, where the first electrode is arranged at one end of the touch part far away from the device body; a second electrode, where the second electrode is arranged on the touch part, and the second electrode and the first electrode are spaced apart from each other; a third electrode, where the third electrode is arranged on the touch part, and the third electrode is spaced apart from each of the first electrode and the second electrode; and a control circuit, where the control circuit is arranged on the device body, and the control circuit is electrically connected to each of the first electrode, the second electrode, and the third electrode. In a case that the stylus is matched with a touch device, a first capacitor is formed between the first electrode and a first region of the touch device, a second capacitor is formed between the second electrode and a second region of the touch device, and a third capacitor is formed between the third electrode and a third region of the touch device, where the touch device includes a touch surface, and the first region, the second region, and the third region are spaced apart from each other on the touch surface; and the second electrode is configured to detect included angle information or transmit data communication information, the third electrode is configured to detect included angle information or transmit data communication information, and the included angle information is the information of the included angle between the stylus and the touch device. As shown in FIG. 8, the control method may include the steps in S801.

In step S801, within a communication cycle in a case that the stylus is electrically connected to the touch device through the first electrode, at least one of the second electrode and the third electrode is controlled to detect the included angle information within a first time period, and at least one of the second electrode and the third electrode is controlled to transmit the data communication information within a second time period.

The first time period and the second time period are time periods that do not completely overlap within one communication cycle.

In other words, the first time period and the second time period may not overlap or may partially overlap within one communication cycle.

In some embodiments, the first time period may be before the second time period, or the first time period may be after the second time period. A specific order is not limited in the embodiments of this application.

In the embodiments of this application, within a communication cycle in a case that the stylus is electrically connected to the touch device through the first electrode, at least one of the second electrode and the third electrode is controlled to detect the included angle information within a first time period, and at least one of the second electrode and the third electrode is controlled to transmit the data communication information within a second time period. The included angle information is detected through at least one of the plurality of electrodes, so that the area of an electrode that detects the included angle information is decreased. In this way, detected included angle information is more accurate, and handwriting presented on the touch device may be closer to a stroke point effect during real writing. An electrode that transmits the data communication information is determined by using the detected included angle information, so that the efficiency of data communication between the stylus and the touch device is higher.

In a possible implementation of this application, before the step of controlling at least one of the second electrode and the third electrode to transmit the data communication information within a second time period, the control method may further include: sending a first indication information to the touch device through the first electrode in a case that the stylus is electrically connected to the touch device through the first electrode, where the first indication information is used for indicating a coordinate of the stylus on a display screen of the touch device.

In other words, the stylus may first perform recognition and matching on the touch device through the first electrode, and then determine a coordinate on the touch device, to facilitate in subsequently detecting an included angle and transmitting data communication information.

In a possible implementation of this application, the second time period is at least partially after the first time period. The controlling at least one of the second electrode and the third electrode to transmit the data communication information within a second time period may include: controlling the at least one of the second electrode and the third electrode to send the included angle information to the touch device within the second time period.

The included angle information is used for instructing the touch device to adjust thickness of handwriting of the stylus. In other words, the touch device can control the thickness of the stylus according to the included angle information. In some embodiments, a thickness of the handwriting is in inverse proportion to the included angle.

In a possible implementation of this application, the third electrode includes a plurality of sub-electrodes, the plurality of sub-electrodes are electrically connected in parallel, and the plurality of sub-electrodes are spaced apart from each other in an axial direction of the stylus.

Correspondingly, the controlling, within a communication cycle in a case that the stylus is electrically connected to the touch device through the first electrode, at least one of the second electrode and the third electrode to detect the included angle information within a first time period, and controlling at least one of the second electrode and the third electrode to transmit the data communication information within a second time period may include: controlling, within a communication cycle in a case that the stylus is electrically connected to the touch device through the first electrode, at least one of the second electrode and the plurality of sub-electrodes to detect the included angle information within the first time period, and controlling at least one of the second electrode and the plurality of sub-electrodes to transmit the data communication information within the second time period.

In other words, the plurality of sub-electrodes in the third electrode may transmit the data communication information and may detect the included angle information.

In a possible implementation of this application, in a case that the second time period is at least partially after the first time period, the control method may further include the following steps:
 determining a first target electrode according to the included angle information, where the first target electrode is at least one of the second electrode and the plurality of sub-electrodes; controlling the first target electrode to transmit the data communication information within the second time period;
 and/or
 determining a second target electrode according to the included angle information, where the second target electrode is at least one of the second electrode and the plurality of sub-electrodes, and the second target electrode is an electrode that detects the included angle information within a first time period within a next communication cycle.

In other words, in a case that the first time period is before the second time period, in a current cycle, included angle information is first detected, and then a target electrode is determined according to the included angle information for transmission of data communication information, or a target electrode is determined according to current included angle information for detection of included angle information in a next cycle.

Correspondingly, in another embodiment, in a case that the first time period is at least partially after the second time period, the control method may include the following steps:
 determining a third target electrode according to included angle information detected within a previous communication cycle, where the third target electrode is at least one of the second electrode and the plurality of sub-electrodes; controlling the third target electrode to transmit the data communication information within the second time period;
 and/or
 determining a fourth target electrode according to included angle information detected within a previous communication cycle, where the fourth target electrode is at least one of the second electrode and the plurality of sub-electrodes, and controlling the fourth target electrode to detect the included angle information within the first time period.

In some embodiments, a quantity of second electrodes and sub-electrodes in the third electrode that are conducted to the control circuit may be controlled according to the included angle between the stylus and the touch device.

The quantity of electrodes is in direct proportion to the included angle.

In a possible implementation of this application, in a case that the quantity of electrodes conducted to the control circuit is greater than or equal to two, the method may further include: determining, according to a size of an electrode conducted to the control circuit, a size of data transmitted between each electrode and the touch device.

In a possible implementation of this application, in a case that the quantity of electrodes conducted to the control circuit is greater than or equal to two, the method may further include: determining, according to a size of an electrode conducted to the control circuit, a type of data transmitted between each electrode and the touch device.

The steps of this embodiment of this application have been described in detail in the foregoing structure embodiments, and details are not described in this embodiment again.

An embodiment of this application further provides a control apparatus, including: a first control module, configured to control, within a communication cycle in a case that the stylus is electrically connected to the touch device through the first electrode, at least one of the second electrode and the third electrode to detect the included angle information within a first time period, and control at least one of the second electrode and the third electrode to transmit the data communication information within a second time period.

The first time period and the second time period are time periods that do not completely overlap within one communication cycle.

In the embodiments of this application, within a communication cycle in a case that the stylus is electrically connected to the touch device through the first electrode, the first control module controls at least one of the second electrode and the third electrode to detect the included angle information within a first time period, and controls at least one of the second electrode and the third electrode to transmit the data communication information within a second time period. The included angle information is detected through at least one of the plurality of electrodes, so that the area of an electrode that detects the included angle information is decreased. In this way, detected included angle information is more accurate, and handwriting presented on the touch device may be closer to a stroke point effect during real writing. An electrode that transmits the data communication information is determined by using the detected included angle information, so that the efficiency of data communication between the stylus and the touch device is higher.

In some embodiments, the apparatus may further include a sending module.

In some embodiments, the sending module is configured to send a first indication information to the touch device through the first electrode in a case that the stylus is electrically connected to the touch device through the first electrode, where the first indication information is used for indicating a coordinate of the stylus on a display screen of the touch device.

In some embodiments, the second time period is at least partially after the first time period; and the first control module may include a first control submodule.

In some embodiments, the first control submodule is configured to control the at least one of the second electrode and the third electrode to send the included angle information to the touch device within the second time period.

In some embodiments, the third electrode includes a plurality of sub-electrodes. The plurality of sub-electrodes are electrically connected in parallel, and the plurality of sub-electrodes are spaced apart from each other in an axial direction of the stylus. The first control module may include a second control submodule.

In some embodiments, the second control submodule is configured to control, within a communication cycle in a case that the stylus is electrically connected to the touch device through the first electrode, at least one of the second electrode and the plurality of sub-electrodes to detect the included angle information within the first time period, and control at least one of the second electrode and the plurality of sub-electrodes to transmit the data communication information within the second time period.

In some embodiments, the second time period is at least partially after the first time period; and the control apparatus may further include the following modules:

a first determining module, configured to determine a first target electrode according to the included angle information, where the first target electrode is at least one of the second electrode and the plurality of sub-electrodes;

a second control module, configured to control the first target electrode to transmit the data communication information within the second time period;

and/or a second determining module, configured to determine a second target electrode according to the included angle information, where the second target electrode is at least one of the second electrode and the plurality of sub-electrodes, and the second target electrode is an electrode that detects the included angle information within a first time period within a next communication cycle.

In some embodiments, the first time period is at least partially after the second time period; and the control apparatus may further include the following modules:

a third determining module, configured to determine a third target electrode according to included angle information detected within a previous communication cycle, where the third target electrode is at least one of the second electrode and the plurality of sub-electrodes;

a third control module, configured to control the third target electrode to transmit the data communication information within the second time period;

and/or a fourth determining module, configured to determine a fourth target electrode according to included angle information detected within a previous communication cycle, where the fourth target electrode is at least one of the second electrode and the plurality of sub-electrodes, and control the fourth target electrode to detect the included angle information within the first time period.

The control apparatus provided in the embodiments of this application can implement the processes implemented in the method embodiment of FIG. 8, which will not be described in detail herein again to avoid repetition.

In some embodiments, as shown in FIG. 9, an embodiment of this application further provides an electronic device 900, including a processor 901, a memory 902, and a program or instructions stored in the memory 902 and runnable on the processor 901, the program or instructions, when executed by the processor 901, implementing the processes of the embodiments of the control method for a stylus, and achieving the same technical effect. To avoid repetition, details are not described herein again.

It is to be noted that, the electronic device in the embodiments of this application includes the mobile electronic device and the non-mobile electronic device.

Figure 10:
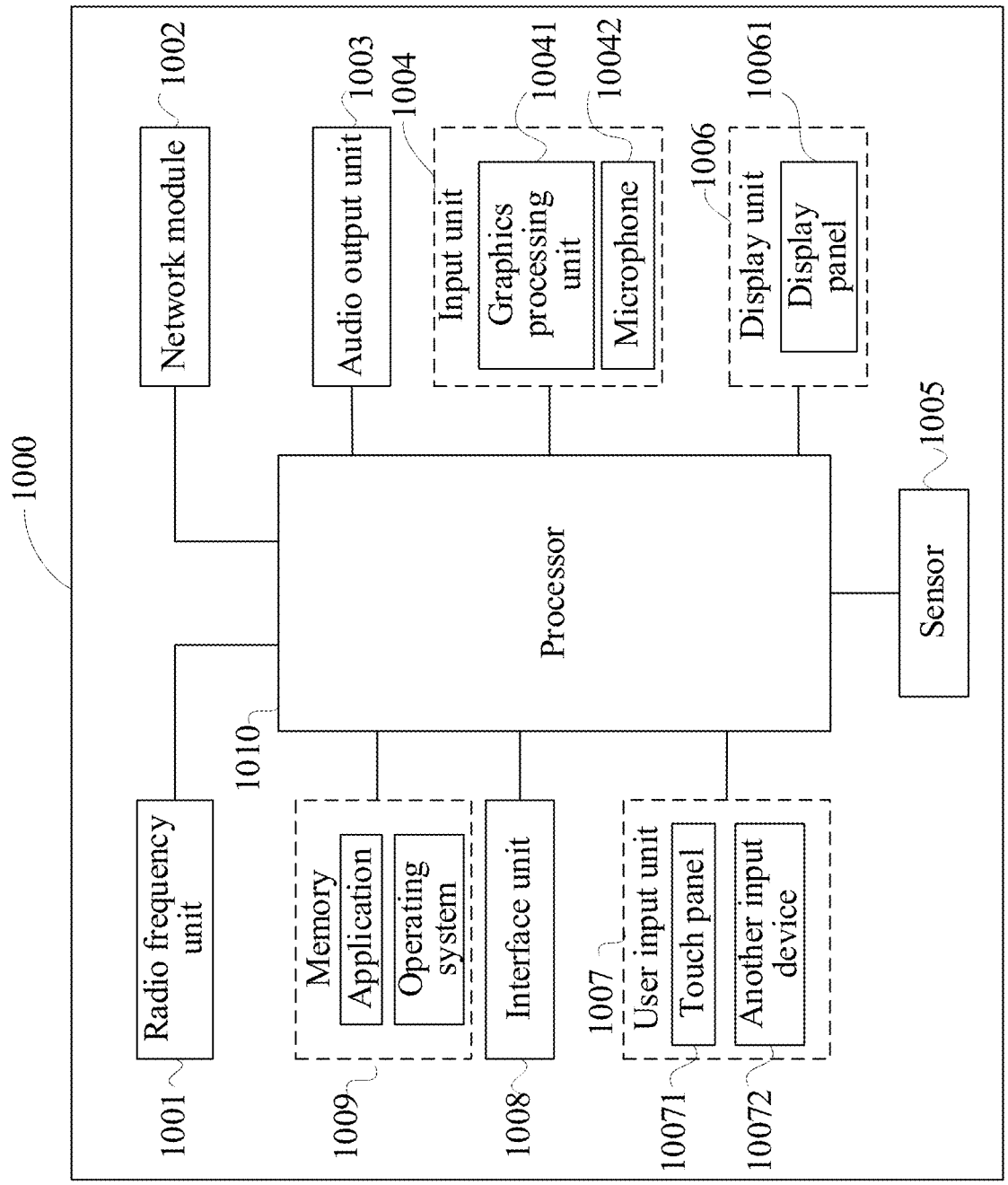
FIG. 10 is a schematic diagram of a hardware structure of an electronic device according to an embodiment of this application.

FIG. 10 is a schematic diagram of a hardware structure of an electronic device implementing an embodiment of this application.

The electronic device 1000 includes, but is not limited to, components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

A person skilled in the art may understand that, the electronic device 1000 may further include a power supply (such as a battery) for supplying power to the components. In some embodiments, the power supply may be logically connected to the processor 1010 by using a power management system, thereby implementing functions such as charging, discharging, and power consumption management by using the power management system. The electronic device structure shown in FIG. 10 does not constitute a limitation to the electronic device. The electronic device may include more or fewer components than those shown in the figure, or some components may be combined, or a different component deployment may be used. Details are not described herein again.

The processor 1010 is configured to control, within a communication cycle in a case that the stylus is electrically connected to the touch device through the first electrode, at least one of the second electrode and the third electrode to detect the included angle information within a first time period, and control at least one of the second electrode and the third electrode to transmit the data communication information within a second time period. The first time period and the second time period are time periods that do not completely overlap within one communication cycle.

In the embodiments of this application, within a communication cycle in a case that the stylus is electrically connected to the touch device through the first electrode, at least one of the second electrode and the third electrode is controlled to detect the included angle information within a first time period, and at least one of the second electrode and the third electrode is controlled to transmit the data communication information within a second time period. The included angle information is detected through at least one of the plurality of electrodes, so that the area of an electrode that detects the included angle information is decreased. In this way, detected included angle information is more accurate, and handwriting presented on the touch device may be closer to a stroke point effect during real writing. An electrode that transmits the data communication information is determined by using the detected included angle information, so that the efficiency of data communication between the stylus and the touch device is higher.

In some embodiments, the processor 1010 is further configured to send a first indication information to the touch device through the first electrode in a case that the stylus is electrically connected to the touch device through the first electrode, where the first indication information is used for indicating a coordinate of the stylus on a display screen of the touch device.

In other words, the stylus may first perform recognition and matching on the touch device through the first electrode, and then determine a coordinate on the touch device, to facilitate in subsequently detecting an included angle and transmitting data communication information.

In some embodiments, the processor 1010 is further configured to control the at least one of the second electrode and the third electrode to send the included angle information to the touch device within the second time period.

In some embodiments, the processor 1010 is further configured to control, within a communication cycle in a case that the stylus is electrically connected to the touch device through the first electrode, at least one of the second electrode and the plurality of sub-electrodes to detect the included angle information within the first time period, and control at least one of the second electrode and the plurality of sub-electrodes to transmit the data communication information within the second time period.

In other words, the plurality of sub-electrodes in the third electrode may transmit the data communication information and may detect the included angle information.

In some embodiments, the processor 1010 is further configured to: determine a first target electrode according to the included angle information, where the first target electrode is at least one of the second electrode and the plurality of sub-electrodes; control the first target electrode to transmit the data communication information within the second time period; and/or determine a second target electrode according to the included angle information, where the second target electrode is at least one of the second electrode and the plurality of sub-electrodes, and the second target electrode is an electrode that detects the included angle information within a first time period within a next communication cycle.

In some embodiments, the processor 1010 is further configured to: determine a third target electrode according to included angle information detected within a previous communication cycle, where the third target electrode is at least one of the second electrode and the plurality of sub-electrodes; control the third target electrode to transmit the data communication information within the second time period; and/or determine a fourth target electrode according to included angle information detected within a previous communication cycle, where the fourth target electrode is at least one of the second electrode and the plurality of sub-electrodes, and controlling the fourth target electrode to detect the included angle information within the first time period.

It may be understood that, in the embodiments of this application, the input unit 1004 may include a Graphics Processing Unit (GPU) 10041 and a microphone 10042. The graphics processing unit 10041 processes image data of a static picture or a video obtained by an image capturing apparatus (for example, a camera) in a video capturing mode or an image capturing mode. The display unit 1006 may include a display panel 10061, for example, a display panel 10061 configured in a form such as a liquid crystal display or an organic light-emitting diode. The user input unit 1007 includes a touch panel 10071 and another input device 10072. The touch panel 10071 is also referred to as a touchscreen. The touch panel 10071 may include two parts: a touch detection apparatus and a touch controller. The another input device 10072 may include, but is not limited to, a physical keyboard, a functional key (such as a volume control key or a switch key), a track ball, a mouse, and a joystick, and the details will not be described herein again. The memory 1009 may be configured to store a software program and various data, including but not limited to an application or an operating system. The processor 1010 may integrate an application processor and a modem processor. The application processor mainly processes an operating system, a user interface, an application, and the like. The modem processor mainly processes wireless communication. It may be understood that the foregoing modem may either not be integrated into the processor 1010.

An embodiment of this application further provides a readable storage medium, storing a program or instructions, the program or instructions, when executed by a processor, implementing the processes of the embodiments of the control method for a stylus, and achieving the same technical effect. To avoid repetition, details are not described herein again.

The processor is a processor in the electronic device in the foregoing embodiments. The readable storage medium includes a computer-readable storage medium, for example, a Read-Only Memory (ROM), a Random Access Memory (RAM), a magnetic disk, an optical disk, or the like.

An embodiment of this application further provides a chip, including a processor and a communication interface coupled to each other, the processor being configured to run a program or instructions to implement the processes of the embodiments of the control method for a stylus, and can achieve the same technical effects. To avoid repetition, details are not described herein again.

It may be understood that, the chip mentioned in this embodiment of this application may also be referred to as a system-level chip, a system chip, a chip system, a system on chip, or the like.

An embodiment of this application further provides a computer program product, where the computer program product is stored in a non-volatile storage medium, and the computer program product is configured to be executed by at least one processor to implement the processes of the embodiments of the control method for a stylus, and can achieve the same technical effects. To avoid repetition, details are not described herein again.

An embodiment of this application further provides a processing apparatus, where the processing apparatus is configured to perform the processes of the embodiments of the control method for a stylus, and can achieve the same technical effects. To avoid repetition, details are not described herein again.

It is to be noted that, the term "include", "comprise", or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Unless otherwise specified, elements defined by the sentence "including one" does not exclude that there are still other same elements in the processes, methods, objects, or apparatuses. In addition, it is to be noted that, the scope of the method and the apparatus in the embodiments of this application is not limited to executing functions in an order shown or discussed, and may also include executing the functions in a substantially simultaneous manner or in a reverse order according to involved functions. For example, the described method may be performed in an order different from that described order, and various steps may also be added, omitted, or combined. In addition, features described with reference to some examples may also be combined in other examples.

According to the descriptions of the foregoing embodiments, a person skilled in the art may clearly understand that the method according to the foregoing embodiments may be implemented by means of software and a necessary general hardware platform, or may be implemented by hardware. In some embodiments, the technical solutions of this application or the part contributing to the related art may be implemented in the form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings. However, this application is not limited to the foregoing specific implementations. The foregoing specific implementations are merely illustrative rather than limitative. A person of ordinary skill in the art may derive various forms from this application without departing from the spirit of this application and the scope claimed by the claims, which are all under the protection of this application.

What is claimed is:

1. A stylus, comprising:
   a device body and a touch part, wherein the touch part is arranged at at least one end of the device body;
   a first electrode, wherein the first electrode is arranged at one end of the touch part far away from the device body;
   a second electrode, wherein the second electrode is arranged on the touch part, and the second electrode and the first electrode are spaced apart from each other;
   a third electrode, wherein the third electrode is arranged on the touch part, and the third electrode is spaced apart from each of the first electrode and the second electrode; and
   a control circuit, wherein the control circuit is arranged on the device body, and the control circuit is electrically connected to each of the first electrode, the second electrode, and the third electrode, wherein the control circuit comprises a coding circuit, a data communication circuit, and a switching circuit,
   wherein:
      the coding circuit and the data communication circuit are each electrically connected to a first end of the switching circuit,
      the second electrode and the third electrode are each electrically connected to a second end of the switching circuit, and
      the stylus has a first working state and a second working state,
   wherein:
      at least one of the second electrode or the third electrode is electrically connected to the coding circuit through the switching circuit when the stylus is in the first working state; and
      at least one of the second electrode or the third electrode is electrically connected to the data communication circuit through the switching circuit when the stylus is in the second working state,
   wherein when the stylus is matched with a touch device, a first capacitor is formed between the first electrode and a first region of the touch device, a second capacitor is formed between the second electrode and a second region of the touch device, and a third capacitor is formed between the third electrode and a third region of the touch device, wherein the touch device comprises a touch surface, and the first region, the second region, and the third region are spaced apart from each other on the touch surface, wherein voltage pulse signals generated by the control circuit are individually sent to the touch device through the first capacitor, the second capacitor and the third capacitor, for the touch device to sense the first region, second region, and third region, respectively, on the touch device, wherein
   the at least one of the second electrode or the third electrode is configured to detect included angle information, and the at least one of the second electrode or the third electrode is configured to transmit data communication information, wherein the included angle information is information of an included angle between the stylus and the touch device.

2. The stylus according to claim 1, wherein a projection area of the second electrode and a projection area of the third electrode are different on a plane on which an axis of the stylus is used as a normal.

3. The stylus according to claim 1, wherein the second electrode and the third electrode are both annular electrodes and are spaced apart from each other in an axial direction of the stylus.

4. The stylus according to claim 1, wherein the third electrode comprises a plurality of sub-electrodes, wherein the plurality of sub-electrodes are electrically connected in parallel, and the plurality of sub-electrodes are spaced apart from each other in an axial direction of the stylus.

5. The stylus according to claim 4, wherein:
the stylus detects the included angle information through at least one of the second electrode or the plurality of sub-electrodes when the stylus is in the first working state; and
the stylus transmits the data communication information through at least one of the second electrode or the plurality of sub-electrodes when the stylus is in the second working state.

6. The stylus according to claim 1, wherein:
the third electrode comprises a plurality of sub-electrodes, the plurality of sub-electrodes being electrically connected in parallel, and the plurality of sub-electrodes being spaced apart from each other in an axial direction of the stylus;
the coding circuit and the data communication circuit are each electrically connected to the first end of the switching circuit, and the second electrode and the sub-electrodes are each electrically connected to the second end of the switching circuit;
when the stylus is in the first working state, the coding circuit is electrically connected to at least one of the second electrode or the plurality of sub-electrodes through the switching circuit according to the included angle information; and
when the stylus is in the second working state, the data communication circuit is electrically connected to at least one of the second electrode or the plurality of sub-electrodes through the switching circuit according to the included angle information.

7. A control method for a stylus, comprising:
controlling, within a communication cycle when the stylus is electrically connected to a touch device through a first electrode, at least one of a second electrode or a third electrode to detect included angle information within a first time period, and
controlling the at least one of the second electrode or the third electrode to transmit data communication information within a second time period, wherein
the first time period and the second time period are time periods that do not completely overlap within one communication cycle, wherein the stylus comprises:
a device body and a touch part, wherein the touch part is arranged at at least one end of the device body;
the first electrode, wherein the first electrode is arranged at one end of the touch part far away from the device body;
the second electrode, wherein the second electrode is arranged on the touch part, and the second electrode and the first electrode are spaced apart from each other;
the third electrode, wherein the third electrode is arranged on the touch part, and the third electrode is spaced apart from each of the first electrode and the second electrode; and
a control circuit, wherein the control circuit is arranged on the device body, and the control circuit is electrically connected to each of the first electrode, the second electrode, and the third electrode, wherein the control circuit comprises a coding circuit, a data communication circuit, and a switching circuit, wherein:

the coding circuit and the data communication circuit are each electrically connected to a first end of the switching circuit,
the second electrode and the third electrode are each electrically connected to a second end of the switching circuit, and
the stylus has a first working state and a second working state,
wherein:
at least one of the second electrode or the third electrode is electrically connected to the coding circuit through the switching circuit when the stylus is in the first working state; and
at least one of the second electrode or the third electrode is electrically connected to the data communication circuit through the switching circuit when the stylus is in the second working state,
wherein when the stylus is matched with the touch device, a first capacitor is formed between the first electrode and a first region of the touch device, a second capacitor is formed between the second electrode and a second region of the touch device, and a third capacitor is formed between the third electrode and a third region of the touch device, wherein the touch device comprises a touch surface, and the first region, the second region, and the third region are spaced apart from each other on the touch surface, wherein voltage pulse signals generated by the control circuit are individually sent to the touch device through the first capacitor, the second capacitor and the third capacitor, for the touch device to sense the first region, second region, and third region, respectively, on the touch device, wherein the at least one of the second electrode or the third electrode is configured to detect the included angle information, and the at least one of the second electrode or the third electrode is configured to transmit the data communication information, wherein the included angle information is information of an included angle between the stylus and the touch device.

8. The control method according to claim 7, wherein before the controlling at least one of the second electrode or the third electrode to transmit data communication information within a second time period, the method further comprises:
sending a first indication information to the touch device through the first electrode when the stylus is electrically connected to the touch device through the first electrode, wherein the first indication information is used for indicating a coordinate of the stylus on a display screen of the touch device.

9. The control method according to claim 7, wherein the second time period is at least partially after the first time period; and
the controlling at least one of the second electrode or the third electrode to transmit data communication information within a second time period comprises:
controlling the at least one of the second electrode or the third electrode to send the included angle information to the touch device within the second time period.

10. The control method according to claim 7, wherein the third electrode comprises a plurality of sub-electrodes, wherein the plurality of sub-electrodes are electrically connected in parallel, and the plurality of sub-electrodes are spaced apart from each other in an axial direction of the stylus; and the controlling, within a communication cycle when the stylus is electrically connected to a touch device through a first electrode, at least one of a second electrode or a third electrode to detect included angle information within a first time period, and controlling at least one of the second electrode or the third electrode to transmit data communication information within a second time period comprises:

controlling, within a communication cycle when the stylus is electrically connected to the touch device through the first electrode, at least one of the second electrode or the plurality of sub-electrodes to detect the included angle information within the first time period, and controlling at least one of the second electrode or the plurality of sub-electrodes to transmit the data communication information within the second time period.

11. The control method according to claim 10, wherein when the second time period is at least partially after the first time period, the method comprises:

determining a first target electrode according to the included angle information, wherein the first target electrode is at least one of the second electrode or the plurality of sub-electrodes;

controlling the first target electrode to transmit the data communication information within the second time period;

or determining a second target electrode according to the included angle information, wherein the second target electrode is at least one of the second electrode or the plurality of sub-electrodes, and the second target electrode is an electrode that detects the included angle information within a first time period within a next communication cycle.

12. The control method according to claim 10, wherein when the first time period is at least partially after the second time period, the method comprises:

determining a third target electrode according to included angle information detected within a previous communication cycle, wherein the third target electrode is at least one of the second electrode or the plurality of sub-electrodes;

controlling the third target electrode to transmit the data communication information within the second time period;

or determining a fourth target electrode according to included angle information detected within a previous communication cycle, wherein the fourth target electrode is at least one of the second electrode or the plurality of sub-electrodes, and controlling the fourth target electrode to detect the included angle information within the first time period.

13. A non-transitory computer readable storage medium, storing instructions that, when executed by a processor, cause the processor to perform operations comprising:

controlling, within a communication cycle when the stylus is electrically connected to a touch device through a first electrode, at least one of a second electrode or a third electrode to detect included angle information within a first time period, and controlling at least one of the second electrode or the third electrode to transmit data communication information within a second time period, wherein the first time period and the second time period are time periods that do not completely overlap within one communication cycle, wherein the stylus comprises:

a device body and a touch part, wherein the touch part is arranged at at least one end of the device body;

the first electrode, wherein the first electrode is arranged at one end of the touch part far away from the device body;

the second electrode, wherein the second electrode is arranged on the touch part, and the second electrode and the first electrode are spaced apart from each other;

the third electrode, wherein the third electrode is arranged on the touch part, and the third electrode is spaced apart from each of the first electrode and the second electrode; and a control circuit, wherein the control circuit is arranged on the device body, and the control circuit is electrically connected to each of the first electrode, the second electrode, and the third electrode, wherein the control circuit comprises a coding circuit, a data communication circuit, and a switching circuit, wherein:

the coding circuit and the data communication circuit are each electrically connected to a first end of the switching circuit, the second electrode and the third electrode are each electrically connected to a second end of the switching circuit, and the stylus has a first working state and a second working state, wherein:

at least one of the second electrode or the third electrode is electrically connected to the coding circuit through the switching circuit when the stylus is in the first working state; and at least one of the second electrode or the third electrode is electrically connected to the data communication circuit through the switching circuit when the stylus is in the second working state, wherein when the stylus is matched with the touch device, a first capacitor is formed between the first electrode and a first region of the touch device, a second capacitor is formed between the second electrode and a second region of the touch device, and a third capacitor is formed between the third electrode and a third region of the touch device, wherein the touch device comprises a touch surface, and the first region, the second region, and the third region are spaced apart from each other on the touch surface, wherein voltage pulse signals generated by the control circuit are individually sent to the touch device through the first capacitor, the second capacitor and the third capacitor, for the touch device to sense the first region, second region, and third region, respectively, on the touch device, wherein the at least one of the second electrode or the third electrode is configured to detect the included angle information, and the at least of one of the second electrode or the third electrode is configured to transmit the data communication information, wherein the included angle information is information of an included angle between the stylus and the touch device.

14. The non-transitory computer readable storage medium according to claim 13, wherein before the controlling at least one of the second electrode or the third electrode to transmit data communication information within a second time period, the operations further comprise:

sending a first indication information to the touch device through the first electrode when the stylus is electrically connected to the touch device through the first electrode, wherein the first indication information is used for indicating a coordinate of the stylus on a display screen of the touch device.

15. The non-transitory computer readable storage medium according to claim 13, wherein the second time period is at least partially after the first time period; and the controlling at least one of the second electrode or the third electrode to transmit data communication information within a second time period comprises:

controlling the at least one of the second electrode or the third electrode to send the included angle information to the touch device within the second time period.

16. The non-transitory computer readable storage medium according to claim 13, wherein the third electrode comprises a plurality of sub-electrodes, wherein the plurality of sub-electrodes are electrically connected in parallel, and the plurality of sub-electrodes are spaced apart from each other in an axial direction of the stylus; and the controlling, within a communication cycle when the stylus is electrically connected to a touch device through a first electrode, at least one of a second electrode or a third electrode to detect included angle information within a first time period, and controlling at least one of the second electrode or the third electrode to transmit data communication information within a second time period comprises:

controlling, within a communication cycle when the stylus is electrically connected to the touch device through the first electrode, at least one of the second electrode or the plurality of sub-electrodes to detect the included angle information within the first time period, and controlling at least one of the second electrode or the plurality of sub-electrodes to transmit the data communication information within the second time period.

17. The non-transitory computer readable storage medium according to claim 16, wherein when the second time period is at least partially after the first time period, the operations comprise:

determining a first target electrode according to the included angle information, wherein the first target electrode is at least one of the second electrode or the plurality of sub-electrodes;

controlling the first target electrode to transmit the data communication information within the second time period;

or determining a second target electrode according to the included angle information, wherein the second target electrode is at least one of the second electrode or the plurality of sub-electrodes, and the second target electrode is an electrode that detects the included angle information within a first time period within a next communication cycle.

18. The non-transitory computer readable storage medium according to claim 16, wherein when the first time period is at least partially after the second time period, the operations comprise:

determining a third target electrode according to included angle information detected within a previous communication cycle, wherein the third target electrode is at least one of the second electrode or the plurality of sub-electrodes;

controlling the third target electrode to transmit the data communication information within the second time period;

or determining a fourth target electrode according to included angle information detected within a previous communication cycle, wherein the fourth target electrode is at least one of the second electrode or the plurality of sub-electrodes, and controlling the fourth target electrode to detect the included angle information within the first time period.

* * * * *